UNITED STATES PATENT OFFICE.

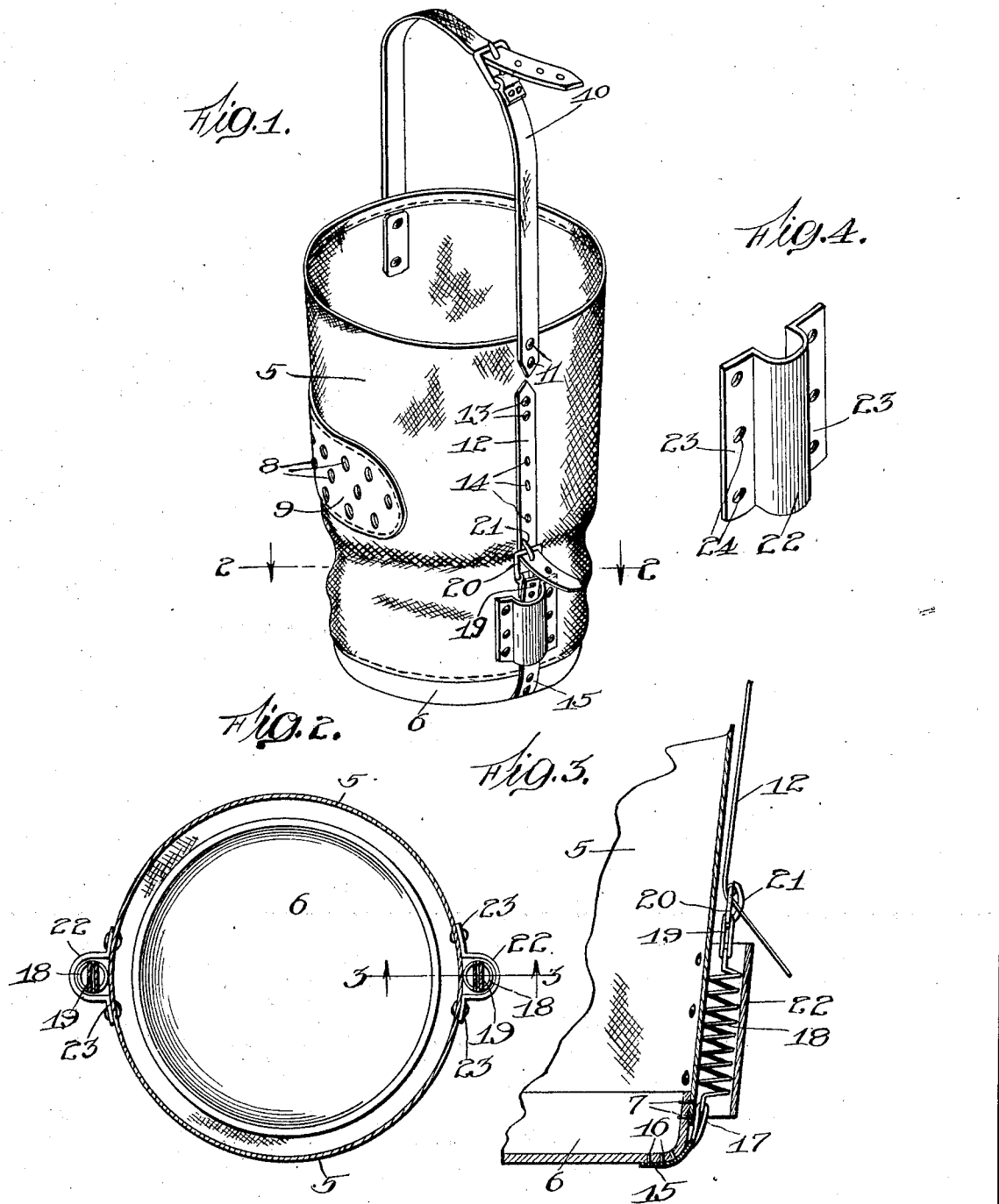

DENNIS D. McKERNAN, OF CHICAGO, ILLINOIS.

FEED-BAG.

No. 830,734.

Specification of Letters Patent.

Patented Sept. 11, 1906.

Application filed March 5, 1906. Serial No. 304,205.

*To all whom it may concern:*

Be it known that I, DENNIS D. MCKERNAN, a citizen of the United States, and a resident of Chicago, in the county of Cook and State of Illinois, have invented certain new and useful Improvements in Feed-Bags, of which the following is a full, clear, and exact specification.

This invention relates to feed-bags especially designed for the feeding of animals, which ordinarily consist of a tubular-like bag of canvas or other flexible material provided with a stiffened bottom and having a strap by which it is suspended from the neck of the animal in its operative position over the mouth of the animal and owing to which they are usually provided with perforations in the side at one or more points for ventilating purposes. In these prior structures there is also a fixed distance between the mouth of the animal and the bottom of the bag, and the result is that as the animal consumes its feed and its depth is thereby lessened some of the feed remains unconsumed, because and only because the animal cannot reach it except by lowering its head until it can find some support for the bottom of the bag, when by further lowering its head it can reach the feed resting on the bottom, which is not only objectionable because the animal before resorting to the above procedure will first toss its head and with it the bag, throwing some of the feed out of the bag, but frequently the only support it can find for the bag is in the mud and frequently water. Again, this inaccessibility of the animal to its food does not improve its disposition and frequently prevents it from getting a full feed and that which it should have before it is obliged to again go to work, it being understood that these feed-bags are employed at midday, when the animals are at work and away from their stables and other places where feed-troughs are not accessible.

The object of my invention is a feed-bag which shall automatically operate to bottomly raise the bottom of the bag toward the mouth of the animal as the feed becomes exhausted and yet remain in its lowered position until a substantial portion of the feed therein is consumed, whereby the feed at the same time will not be unduly pressed against the mouth of the animal.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 illustrates a perspective view of a feed-bag, showing the bottom of the bag in the elevated positions it assumes as the food in the bag is consumed and when otherwise it will be beyond the reach of the animal. Fig. 2 is a transverse section on the line 2 2 of Fig. 1; Fig. 3, a detailed enlarged vertical section on the line 3 3 of Fig. 2, and Fig. 4 a perspective view of the casing for the spring.

Similar numerals of reference indicate the same parts in the several figures of the drawings.

The numeral 5 indicates the body of a feed-bag which is tubular in form and composed of canvas or other flexible fabric and provided with a stiffened bottom 6, which may be of leather, wood, or metal, and secured to the body 5 of the bag by means of rivets 7 (see Fig. 3) or other fastening devices, the said bag being provided at one side with ventilating-openings 8, which may be in the bag and stiffened against collapsing by having them in a piece of leather 9 or other stiffened material secured to the bag.

Secured to opposite sides of the bag at its upper end is a neck-strap 10, which is ordinarily riveted to the bag toward its upper end edges, as indicated at 11, and is of such a length that when the bag is filled with feed and the neck-strap 10 is passed over the head or neck of the animal his mouth will be in convenient position to dispose of substantially the upper portion of such feed, and in this connection it is proper to add that such straps 10 are sometimes composed of two pieces, the opposing ends of which are respectively provided with buckles and holes by which the length of the strap may be adjusted to the mouth of the animal to be fed by shortening and lengthening the strap.

At one side of the bag and preferably in line with the strap 10 is an adjusting-strap 12, which may be a continuation of the strap 10, but for the purposes of feed-bags which have been made up without reference to my invention is preferably a separate strap riveted or otherwise secured to the body of the bag, as shown at 13, and is provided with a series of perforations 14. Immediately below the strap 12 and secured to the bottom 6 of the bag, but may be further up to the sides of the bag, is a holding-strap 15, held at one end by stitches or rivets 16, as may be, and provided in its upper free end with a loop 17, to which is secured, as shown in Fig. 3, a coiled spring 18, to the upper end of which is secured the lower end of an opposing adjusting-strap 19, holding a buckle 20, adapted to be secured to the strap 12 by passing its tongue 21 to any one of the perforations 14 therein and to thereby adjust the tension of the spring 18 for the purposes hereinafter described.

In order to protect the spring 18 from injury and at the same time provide against dirt accumulating therein, it is inclosed by a casing 22, tubular in form, and provided with lateral flanges 23 23, perforated as indicated at 24, as a means for securing the casing to the body of the bag by means of rivets or stitches, as may be, the casing preferably being of metal, but may be of any other substantial non-flexible material or which is sufficiently so to prevent its collapsing and binding upon the spring when pressed against or saving a blow, the casing being open at both ends in order that dirt or feed striking the spring may not lodge therein, but freely discharge at the lower end of the casing.

In operation and in order to adjust the tension of the spring so as to lift the bottom of the bag and with it the feed, which would otherwise be beyond the reach of the animal, the bag it first filled or partly so with the feed and then suspended from the animal's neck or head in such a manner as to have the feed in the bag conveniently close to the animal's mouth. The adjusting-straps 12 and 15 are then adjusted in such a manner as to put upon the spring the entire weight of the feed as well as the weight of the greater portion of the material of the bag, the result of which is that the springs are distended a certain distance or number of inches from their normal condition, and as the flexibility of the spring is such that a certain weight will extend them a certain distance it will be seen that if such weight diminishes, as in the matter of feed being consumed, such consumption creates a gradual contraction of the spring, thereby keeping the feed in the bag at about the same relative position to the animal's mouth until consumed as it was when the bag was first adjusted. So long as the feed is of the same character, or, more accurately speaking, of the same weight and quantity, this same adjustment may be maintained until a change in the gravity or quantity of the feed supplied in the bag; but whenever there is any substantial variation in either then a new adjustment of the tension of the spring should be made in order to best adapt it for convenient access for the animal.

When a feed-bag such as I have described is supplied with feed at any height therein or of any specific gravity and the tension of the spring has been adjusted as described, it will be found that after the animal has consumed the feed ordinarily within its reach the spring by its tension will then commence to lift the body of the bag toward the mouth of the animal and continue this lifting so as to maintain the last of the feed in convenient reach of the animal, but with a force decreasing as the weight of the feed is reduced by the consumption of the animal, so that at no time is either the feed or the bottom of the bag pressed against the mouth of the animal to his discomfort either in feeding or afterward before the bag is removed.

By my invention is not only avoided that heretofore objectionable feature of the animal tossing the bag around and spilling the feed in efforts to eat the latter part of it by setting and pushing it down into mud and water, but means are provided automatically lifting the bag, so that all of the feed therein is in convenient reach of the animal and may be exhausted therefrom by the animal without any undue effort.

Having described my invention, what I claim, and desire to secure by Letters Patent, is—

1. The combination with a feed-bag, of an elastic device connected at one end with the lower portion or bottom of the bag and at its upper end to the body of the bag above its bottom, of means for adjusting the tension of said elastic device, substantially as described.

2. The combination with a feed-bag of an elastic device secured at one end to or near the bottom of the bag, of a strap the upper end of which is secured toward the top of the bag, and an adjusting device connecting the lower portion of said strap to the upper end of said elastic device, substantially as described.

3. A feed-bag comprising in combination therewith of a strap secured to the bottom thereof, a coiled spring having its lower end secured to said strap, of another strap attached to the body of the bag toward its top, and an adjusting device connecting said upper strap with the spring whereby the tension of the spring is increased and diminished, substantially as described.

4. A feed-bag comprising in combination therewith a coiled spring secured at its lower end at or toward the bottom of said bag, a strap and buckle secured to the upper end thereof, and a perforated strap secured to said bag toward the top thereof and provided with perforations adapted to be engaged by said buckle and thereby adjust the tension of said spring, and a casing inclosing said spring, substantially as described.

In witness whereof I have hereunto set my hand this 1st day of March, 1906.

DENNIS D. McKERNAN.

In presence of—
 E. K. MANCHESTER,
 JNO. G. ELLIOTT